Figure 1:
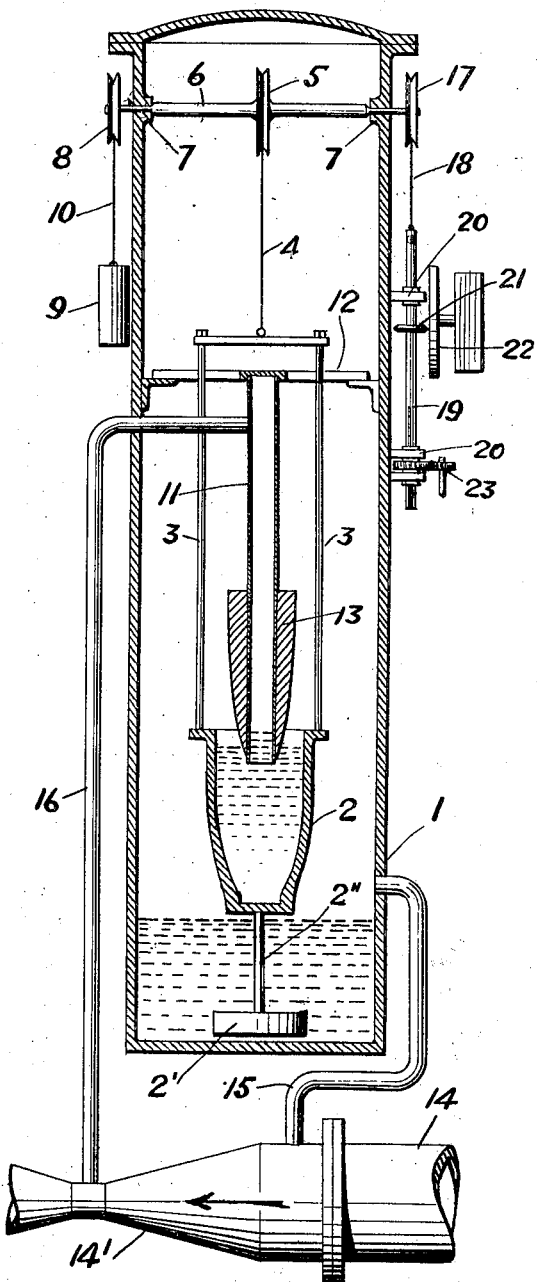

J. W. LEDOUX.
FLUID METER.
APPLICATION FILED JULY 21, 1910.

1,083,689.

Patented Jan. 6, 1914.
2 SHEETS—SHEET 1.

WITNESSES:
Robt R Kitchel
Jos. G. Denny Jr

INVENTOR
John W. Ledoux
BY
Charles N. Butler
ATTORNEY.

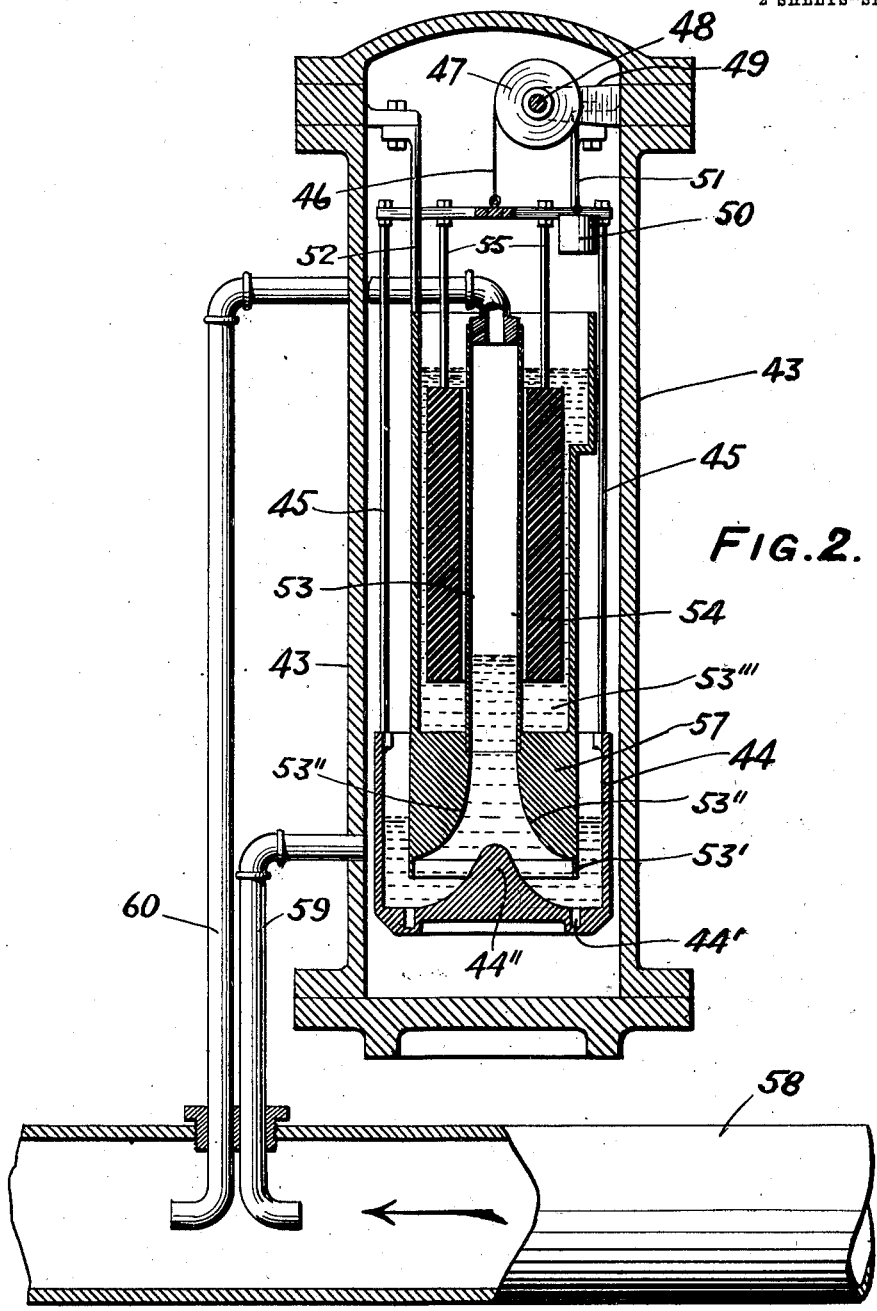

UNITED STATES PATENT OFFICE.

JOHN W. LEDOUX, OF SWARTHMORE, PENNSYLVANIA.

FLUID-METER.

1,083,689.  Specification of Letters Patent.  Patented Jan. 6, 1914.

Application filed July 21, 1910. Serial No. 572,980.

*To all whom it may concern:*

Be it known that I, JOHN W. LEDOUX, a citizen of the United States, residing at Swarthmore, in the county of Delaware and State of Pennsylvania, have invented certain Improvements in Fuid-Meters, of which the following is a specification.

My invention is a meter designed for differentiating pressures of fluid and integrating the differentials. Its leading object is to provide a simple construction having a high degree of accuracy.

A further object is to confine the fluid pressure mechanism within a pressure chamber and thus prevent the escape of liquid.

In the accompanying drawings, Figure 1 is a sectional elevation of a meter embodying my improvements, and Fig. 2 is a sectional elevation of a modified construction.

The invention, as illustrated in Fig. 1, comprises a casing 1 having therein a receptacle 2 depending from a yoke 3 which is connected by a tension member 4 with a sheave 5, the latter being fixed on a shaft 6, journaled in the bearings 7. A sheave 8 is fixed on the shaft exterior to the casing and has a weight 9 connected therewith by a tension member 10 to provide a counterbalance for the load carried within the casing by the sheave 5. A tubular receptacle 11, closed at the top and open at the bottom, depends from the supporting member 12, into mercury in the receptacle 2 and has fixed thereon a displacing device 13. A conduit 14 has a normal section thereof connected by a duct 15, with the bottom of the casing 1 and the throat of its Venturi section 14' connected by the duct 16 with the top of the inverted receptacle 11. The vessel 2 has a float 2' suspended from the bottom thereof by the slender rod 2'' and constantly immersed in a liquid (mercury) heavier than that to be measured, in the bottom of the casing 1 below the discharge end of the duct 15. The buoyancy due to the displacement of this float provides an upward thrust acting to counterbalance the weight of the receptacle 2 and its contents, thus relieving the bearings of the shaft 6 and permitting the material reduction of the weight of the counterpoise 9. When there is no flow in the conduit 14, the pressures from fluid therein, communicated through the ducts 15 and 16 to the mercury surfaces in the receptacles 2 and 11, are equal. As the flow rises from zero to the maximum, the pressure communicated from the fluid in the casing 1 to the surface of the mercury in the receptacle 2 rises above that communicated through the receptacle 11 to the surface of the mercury therein. Consequently mercury is forced from the receptacle 2 into the receptacle 11 and the receptacle 2 rises against the resistance opposed by the displacement of mercury by the device 13. The cross sections of the device 13 increase from the bottom toward the top thereof, so that the movement of the receptacle and the changes in the rate of flow in the conduit are related in a simple ratio. The movement of the receptacle 2 is communicated, through the intermediate parts, to the shaft 6 and the sheave 17 fixed thereon exterior to the casing. A tension member 18 connects the sheave 17 with a shaft 19, revoluble and longitudinally movable in the bearings 20; the shaft being revolved by a wheel 21 thereon movable in contact with the constantly rotating disk 22 between its center and periphery. The shaft actuates a register train 23.

The improvements, as illustrated in Fig. 2, comprise a casing 43 containing a vessel 44 which depends from a yoke 45; the vessel having the bottom channel 44' and the displacing device 44'' gradually decreasing in cross sectional area from its base to its apex. The yoke is suspended from a tension member 46 connected with a sheave 47 which is fixed on a shaft 48, the latter being journaled in bearings 49 and adapted for operating an integrating device exterior to the casing. A poise 50 is connected by the tension member 51 with the sheave which is counter-balanced thereby. A compound receptacle is supported in the casing by hangers 52 and comprises the inner chamber 53 having a lower section 53'' gradually increasing in cross-sectional area to a termination in the cylindrical rim or bottom flange 53', the curvature of the section 53'' corresponding to that of the concentrically disposed part 44'' and the rim 53' registering with the channel 44'; the receptacle also comprises an exterior chamber 53''' concentric to the chamber 53 and below this chamber the stationary displacing device 57 having a cylindrical exterior and a tapered interior surface. A hollow displacing device 54, depending from the hangers 55 connected with the yoke 45, is placed in the chamber 53''', around the chamber 53, the displacing device, by reason of its buoyancy, acting through the parts 55 and 45 to support the vessel 44. The conduit 58 is connected by the high pressure Pitot tube 59 with the interior of the casing 43, exterior to the chamber 53, and by the low pressure Pitot tube 60 with the top of the chamber 53. Liquid heavier than that flowing in the conduit 58 is placed in the vessel 44, whence it rises into the chamber 53. When there is no flow in the conduit, the heavy liquid in the vessel 44 and chamber 53 will stand at the same level and the vessel will occupy its lowest position, the rim 53' acting as a mercury seal. As the flow in the conduit rises, the pressure communicated through the tube 59 becomes gradually greater than that communicated through the tube 60, the heavier liquid is forced from the vessel 44 upwardly into the chamber 53, and the vessel rises, the movement being communicated to the shaft 48 through the intermediate mechanism. The curvature of the section 53'' is such that the rate of movement of the vessel and consequently of the integrating shaft 48 is regulated so that the latter's movement is a simple proportion of the rate of flow to be measured. The displacing device 44'' may be dispensed with, as it is merely used to reduce the amount of the heavier liquid required in the vessel 44 and in the section 53'' and thereby reduce the weight and friction on the shaft 48. It will be understood that this form of my invention is equally applicable to the conduit with the Venturi section.

Having described my invention, I claim:

1. In a fluid meter, a reciprocating vessel, a stationary chamber having a bottom opening communicating therewith, said chamber having a wall varying in cross sectional area, and a liquid for sealing communication between said vessel and chamber, said liquid being displaced by said varying wall as said vessel rises.

2. In a fluid meter, a conduit, a casing, a balanced reciprocating receptacle in said casing, said receptacle containing a heavier liquid than that to be measured, a passage having an open bottom sealed by said heavier liquid, means for communicating differential pressures from said conduit to said heavier liquid within and without said passage, and a stationary device increasing in cross sectional area from its bottom upwardly whereby said heavier liquid is displaced and the movement of said receptacle is regulated to a simple ratio to changes in the flow in said conduit.

3. In a fluid meter, a conduit for carrying a liquid to be measured, a casing, a vessel movable vertically in said casing, a liquid heavier than that to be measured in said vessel, a stationary chamber in said casing having an open bottom adapted to be sealed by said liquid in said vessel, and means for communicating differential pressures from the liquid in said conduit to the surface of said heavier liquid within and without said chamber, said chamber decreasing in cross sectional area from a bottom section upwardly and having a wall increasing in cross sectional area from said bottom section upwardly so that the movement of said vessel shall be in a simple ratio to changes in the flow of liquid in said conduit.

4. In a fluid meter, a casing, a balanced vessel and a float connected therewith and adapted to reciprocate in said casing, said vessel containing a liquid heavier than that to be measured, a stationary chamber sealed by said liquid, a conduit, means for differentiating the pressures of a liquid flowing in said conduit and transmitting the same to said casing within and without said chamber, and a stationary chamber containing a liquid in which said float acts to counter-balance said vessel, said first named chamber having a wall increasing in cross sectional area in an upward direction so that the movement of said receptacle is regulated to a simple ratio to changes in the flow in said conduit.

In witness whereof I have hereunto set my name this 19th day of July, 1910, in the presence of the subscribing witnesses.

JOHN W. LEDOUX.

Witnesses:
Jos. G. Denny, Jr.,
Robert James Early.

---

Copies of this patent may be obtained for five cents each, by addressing the "Commissioner of Patents, Washington, D. C."